(12) United States Patent
Cakmakci et al.

(10) Patent No.: US 10,338,390 B2
(45) Date of Patent: Jul. 2, 2019

(54) METHOD FOR FABRICATING A CURVED EYEPIECE

(71) Applicant: Google Inc., Mountain View, CA (US)

(72) Inventors: Ozan Cakmakci, Sunnyvale, CA (US); Oscar A. Martinez, Mountain View, CA (US); James C. Dunphy, San Jose, CA (US); Hongqin Shi, San Jose, CA (US); John Fitch, Los Altos, CA (US); Omar Negrete, San Francisco, CA (US); Yeh Tung, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 169 days.

(21) Appl. No.: 15/186,365

(22) Filed: Jun. 17, 2016

(65) Prior Publication Data

US 2017/0363870 A1    Dec. 21, 2017

(51) Int. Cl.
*G02B 27/01*    (2006.01)
*B29D 11/00*    (2006.01)
(Continued)

(52) U.S. Cl.
CPC ...... *G02B 27/0172* (2013.01); *B29C 45/0055* (2013.01); *B29D 11/00692* (2013.01);
(Continued)

(58) Field of Classification Search
CPC ......... B29C 45/0055; B29L 2011/0016; G02B 2027/0116; G02B 2027/013; G02B 2027/0154; G02B 2027/0178; G02B 25/001; G02B 27/0172; G02B 27/0176; A61B 3/02; B24B 13/005; B24B 7/00; G06F 15/46; B32B 41/00
(Continued)

(56) References Cited

U.S. PATENT DOCUMENTS 5,880,888 A    3/1999    Schoenmakers et al.
5,886,822 A    3/1999    Spitzer
(Continued)

FOREIGN PATENT DOCUMENTS

CN    204086718    1/2015
DE    102014207492 A1    10/2014
(Continued)

OTHER PUBLICATIONS

EP1593458A2_Machine Translation (Year: 2005).*
(Continued)

*Primary Examiner* — Matthew J Daniels
*Assistant Examiner* — Yunju Kim

(57) ABSTRACT

Techniques and mechanisms for fabricating an eyepiece from a lens blank including blank bodies that are bonded to each other. In an embodiment, the blank bodies are formed by injection molding and adhered to one another. Fabrication of the eyepiece includes variously machining the blank bodies to shape respective lens bodies of the eyepiece. One or more blocking structures are coupled to reinforce the lens blank during at least part of such machining. In another embodiment, any blocking structures that are to resist forces of a particular machining process are coupled only indirectly to one of the blank bodies.

11 Claims, 11 Drawing Sheets

(51) Int. Cl.
*B29C 45/00* (2006.01)
*G02B 25/00* (2006.01)
*B29L 11/00* (2006.01)

(52) U.S. Cl.
CPC ....... *G02B 25/001* (2013.01); *G02B 27/0176* (2013.01); *B29L 2011/0016* (2013.01); *G02B 2027/013* (2013.01); *G02B 2027/0116* (2013.01); *G02B 2027/0132* (2013.01); *G02B 2027/0154* (2013.01); *G02B 2027/0178* (2013.01); *G02B 2027/0194* (2013.01)

(58) Field of Classification Search
USPC ........ 264/1.7; 351/244; 364/474.06; 156/64; 359/630–636
See application file for complete search history.

(56) References Cited

U.S. PATENT DOCUMENTS

| | | | |
|---|---|---|---|
| 6,091,546 A | 7/2000 | Spitzer | |
| 6,094,241 A | 7/2000 | Yamazaki | |
| 6,384,982 B1 | 5/2002 | Spitzer | |
| 6,760,169 B2 | 7/2004 | Takahashi et al. | |
| 6,825,987 B2 | 11/2004 | Repetto et al. | |
| 6,879,443 B2 | 4/2005 | Spitzer et al. | |
| 6,961,162 B2 | 11/2005 | Nakamura et al. | |
| 7,057,814 B2 | 6/2006 | Boyd et al. | |
| 7,242,527 B2 | 7/2007 | Spitzer et al. | |
| 7,332,045 B2 * | 2/2008 | Shanbaum ............ | B24B 13/005 156/360 |
| 7,411,637 B2 | 8/2008 | Weiss | |
| 7,542,209 B2 | 6/2009 | McGuire, Jr. | |
| 7,724,443 B2 | 5/2010 | Amitai | |
| 7,944,616 B2 | 5/2011 | Mukawa | |
| 8,004,765 B2 | 8/2011 | Amitai | |
| 8,212,859 B2 | 7/2012 | Tang et al. | |
| 8,471,967 B2 | 6/2013 | Miao et al. | |
| 8,488,246 B2 | 7/2013 | Border et al. | |
| 8,639,072 B2 | 1/2014 | Popovich et al. | |
| 8,665,178 B1 | 3/2014 | Wang | |
| 8,830,569 B2 | 9/2014 | Filipovich et al. | |
| 8,848,289 B2 | 9/2014 | Amirparviz et al. | |
| 8,964,298 B2 | 2/2015 | Haddick et al. | |
| 8,970,962 B2 | 3/2015 | Filipovich et al. | |
| 8,989,535 B2 | 3/2015 | Robbins | |
| 9,013,793 B2 | 4/2015 | Gupta et al. | |
| 9,213,178 B1 | 12/2015 | Giri et al. | |
| 9,366,869 B2 | 6/2016 | Martinez et al. | |
| 2001/0001570 A1 | 5/2001 | Houston et al. | |
| 2002/0036751 A1 | 3/2002 | Tanijiri et al. | |
| 2009/0122414 A1 | 5/2009 | Amitai | |
| 2010/0046070 A1 | 2/2010 | Mukawa | |
| 2010/0149073 A1 | 6/2010 | Chaum et al. | |
| 2011/0149201 A1 | 6/2011 | Powell et al. | |
| 2011/0193814 A1 | 8/2011 | Gay et al. | |
| 2012/0162549 A1 | 7/2012 | Gao et al. | |
| 2012/0212398 A1 | 8/2012 | Border et al. | |
| 2013/0016292 A1 | 1/2013 | Miao et al. | |
| 2013/0242392 A1 | 9/2013 | Amirparviz et al. | |
| 2014/0140654 A1 | 5/2014 | Brown et al. | |
| 2014/0329443 A1 | 11/2014 | Savoie | |
| 2015/0062716 A1 | 3/2015 | Komatsu et al. | |
| 2015/0177519 A1 | 6/2015 | Cakmakci et al. | |
| 2015/0260992 A1 | 9/2015 | Luttmann et al. | |
| 2016/0313557 A1 * | 10/2016 | Schmidt ................. | G02B 3/08 |

FOREIGN PATENT DOCUMENTS

| | | | |
|---|---|---|---|
| EP | 1593458 A2 * | 11/2005 | ........... B24B 13/005 |
| JP | 2001066543 A | 8/2001 | |
| WO | WO 2013/112705 A1 | 8/2013 | |
| WO | WO 2013/175465 A1 | 11/2013 | |

OTHER PUBLICATIONS

Cakmakci, O.—Head-Worn Displays: A Review, Journal of Display Technology, issued Sep. 2006, 18 pages.
Rolland, J. et al.—Head-Worn Displays: The Future Through New Eyes, Optics & Photonics News, issued Apr. 2009, 8 pages.
U.S. Appl. No. 15/093,227, filed Apr. 7, 2016, Martinez et al.
U.S. Appl. No. 15/093,235, filed Apr. 7, 2016, Cakmakci et al.
U.S. Appl. No. 14/139,277, filed Dec. 23, 2013, Cakmakci et al.
U.S. Appl. No. 14/730,983, filed Apr. 4, 2015, Cakmakci et al.
U.S. Appl. No. 14/792,084, filed Jul. 6, 2015, Martinez et al.
U.S. Appl. No. 14/949,114, filed Nov. 23, 2015, Cakmakci et al.
PCT/US2016/064839—Invitation to Pay Additional Fees, dated Feb. 15, 2017, 7 pages.
International Search Report and Written Opinion dated Apr. 6, 2017 for PCT Application No. PCT/US2016/064839, 8 pages.
Korean Office Action and Translation thereof dated Dec. 14, 2017 for Taiwan Application No. 105143993, 14 pages.
Office Action dated Jul. 11, 2018 for corresponding TROC (Taiwan) Patent Application No. 105143993, 5 pages.
Written Opinion of the International Preliminary Examining Authority for PCT Application No. PCT/US2016/064839, 6 pages.

* cited by examiner

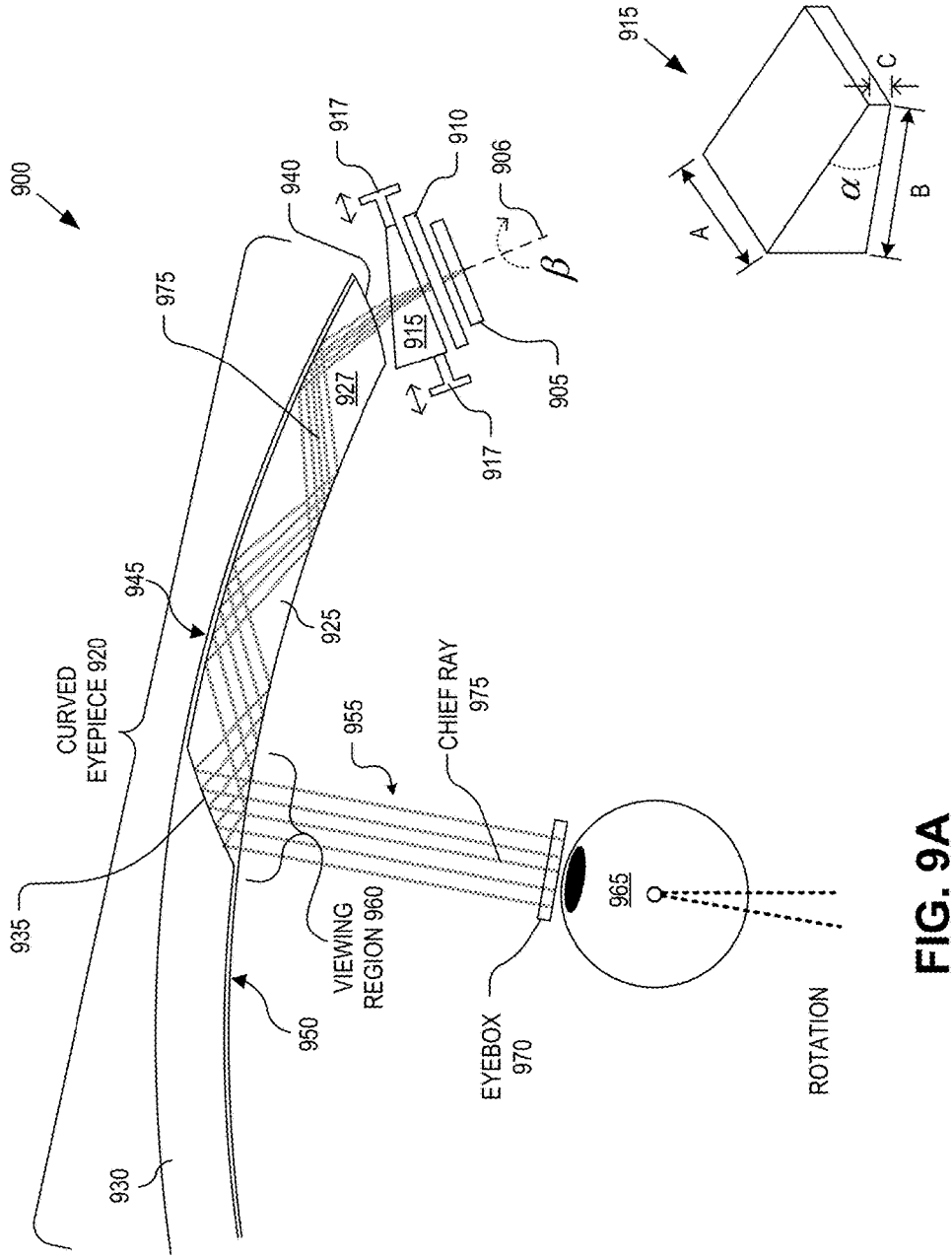

METHOD FOR FABRICATING A CURVED EYEPIECE

BACKGROUND

1. Technical Field

This disclosure relates generally to the field of optics and more particularly, but not exclusively, to head wearable displays.

2. Background Art

A head mounted display ("HMD") or head wearable display is a display device worn on or about the head. HMDs usually incorporate some sort of near-to-eye optical system to create a magnified virtual image placed a few meters in front of the user. Single eye displays are referred to as monocular HMDs while dual eye displays are referred to as binocular HMDs. Some HMDs display only a computer generated image ("CGI"), while other types of HMDs are capable of superimposing CGI over a real-world view. This latter type of HMD typically includes some form of see-through eyepiece and can serve as the hardware platform for realizing augmented reality. With augmented reality the viewer's image of the world is augmented with an overlaying CGI, also referred to as a heads-up display ("HUD").

HMDs have numerous practical and leisure applications. Aerospace applications permit a pilot to see vital flight control information without taking their eye off the flight path. Public safety applications include tactical displays of maps and thermal imaging. Other application fields include video games, transportation, and telecommunications. There is certain to be new found practical and leisure applications as the technology evolves; however, many of these applications are limited due to the cost, size, weight, thickness, field of view, efficiency, and image quality of conventional optical systems used to implement existing HMDs.

BRIEF DESCRIPTION OF THE DRAWINGS

The various embodiments of the present invention are illustrated by way of example, and not by way of limitation, in the figures of the accompanying drawings and in which:

FIG. 9A is a cross-sectional illustration of an optical system fabricated according to an embodiment.

FIG. 9B is a perspective view illustration of a prism used within an optical system fabricated according to an embodiment.

DETAILED DESCRIPTION

Figure 1:
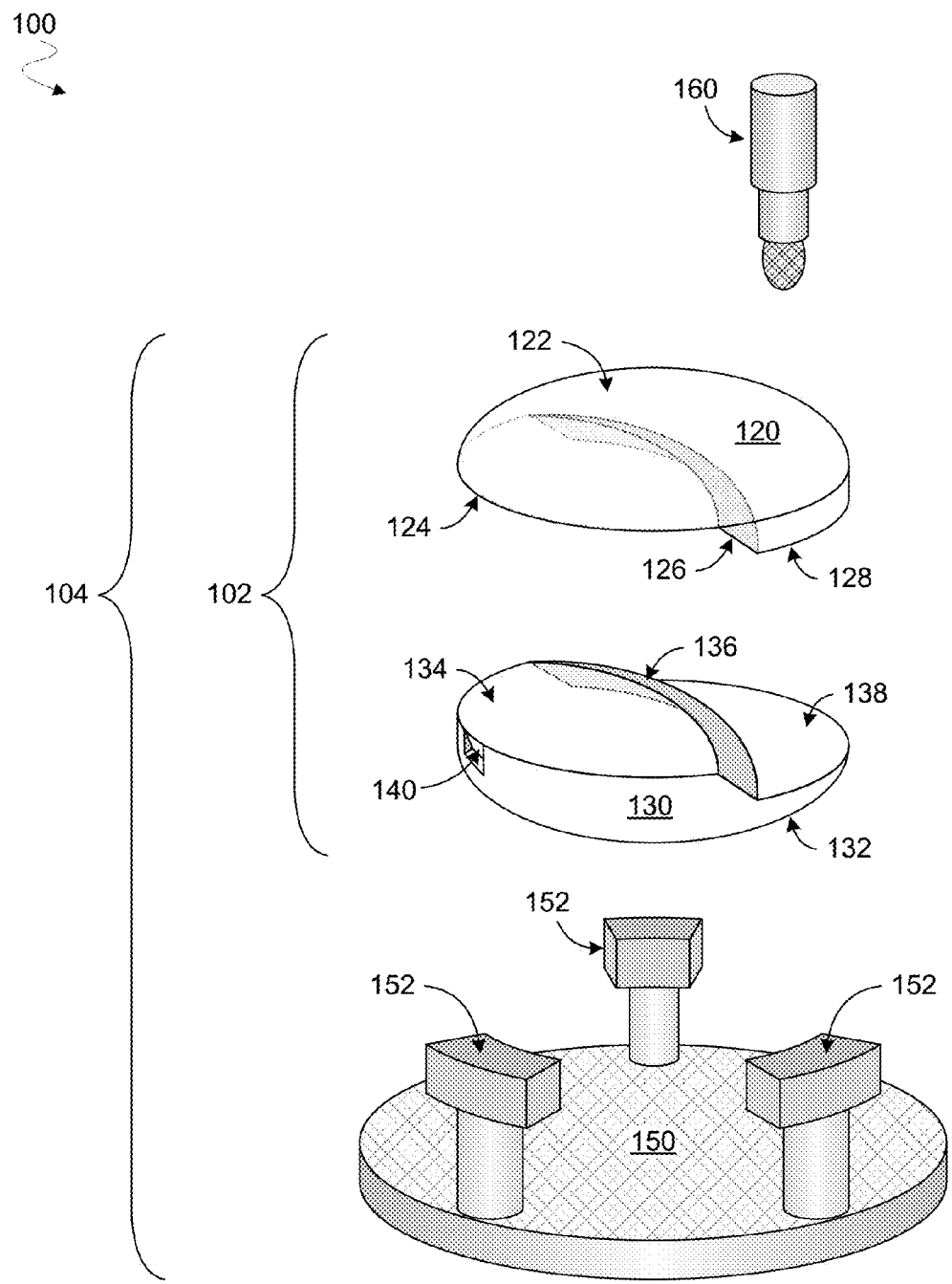
FIG. 1 is an exploded view diagram illustrating elements of a system to form a curved eyepiece according to an embodiment.

Embodiments of a method, apparatus and system for providing a curved eyepiece are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used herein, "lens blank" refers to a structure that may be machined to form any of a variety of lens shapes of an eyepiece. A lens blank according to some embodiments includes a component (referred to herein as a "blank body") comprising a light transmissive material. Such a blank body may be mated with another blank body of the same lens blank—e.g., wherein an interface between the two blank bodies forms a stepped structure. The stepped interface may contribute to the formation of an outcoupling structure (also referred to herein as an "optical combiner") of an eyepiece, wherein the outcoupling structure operates to redirect light out of the eyepiece. Unless otherwise indicated, "assembly" refers herein to a group of components which includes a lens blank or at least a portion of a lens blank that remains after shaping to form an eyepiece at least in part—e.g., where the remaining portion of the lens blank comprises respective portions of blank bodies. The assembly may further include blocking structures that are coupled provide mechanical support for the remaining portion of the lens blank.

Embodiments described herein variously fabricate an eyepiece with processing that includes cutting, grinding and/or otherwise machining a lens blank which includes two blank bodies that are bonded to one another. A blank body may be formed at least in part by a molding process, wherein at least some portion of a surface of that blank body (for brevity, referred to herein as a "surface portion") is formed by such molding. As used herein, "molded surface portion" refers to a surface portion—e.g., not necessarily all of a surface—that is formed by molding and independent of any surface machining and/or polishing that might take place after such molding. In an embodiment, a molded surface portion of a blank body—e.g., the molded surface portion to mate with a corresponding molded surface portion of another blank body—has a total area of at least 1 mm² (e.g., at least 4 mm² and, in some embodiments, at least 10 mm²). Such a molded surface portion may have one or more characteristics of mold processing. As described further herein, a particular surface figure may be one such characteristic. An additional or alternative characteristic may be an absence of any scratch, divet, tough or other such structure (that is characteristic of machining or polishing) that, for example, is 50 microns long or more. In some embodiments, a molded surface portion is devoid of any scratch, divet, tough etc. that is 25 microns long or more. Alternatively or in addition, a molded surface portion may be formed by a thermoplastic material having a glass transition temperature Tg that is between 100° C. and 200° C. Such a glass transition temperature may be determined, for example, by differential scanning calorimetry (DSC), thermal mechanical analysis (TMA) and/or dynamic mechanical analysis (DMA). For brevity, "molded surface portion" is used herein to refer to a surface portion that exhibits one or more such characteristics of formation by mold processing.

In some embodiments, a side of a molded blank body (e.g., a side which includes the molded surface portion) has formed therein or thereon one or more artifacts of injection molding. Such artifacts may include, but are not limited to, a gate residue where a molten plastic (or other such material) was injected into a mold cavity, a sprue (or a residual structure formed by removal of a sprue) and/or a thin plastic structure, referred to as "flash," that results from leakage by an injected blank body material between adjoining mold parts. Another artifact of molding may be one or more marks (e.g., each including having a diameter in a range of 1 mm-5 mm) where ejector pins were used to extract a blank body from a mold). A residual portion resulting from removal of a gate, sprue or other such artifact may have a relatively high birefringence, as compared to that of a molded surface portion of the blank body.

In a given lens blank, respective surface portions of blank bodies—e.g., at least surface portions that are mated to one another at an interface within the lens blank—may each have a respective surface figure that is characteristic of being fabricated by a molding process. "Surface figure" refers herein to a metric of surface irregularity of a surface portion, the metric indicating an average of height differences between peaks of a surface portion and respective valleys of the surface portion. The surface figure metric quantifies an amount of deviation from a curve to which a surface portion substantially conforms—e.g., wherein the curve represents a smoothed approximation of the surface portion. By way of illustration and not limitation, the smoothed curve may correspond to a least squares fit determined based on points along a cross-section of the surface portion (e.g., wherein offsets between respective pairs of such points are each between 25 microns and 50 microns). The surface figure may be an average of peak-to-valley height differences along such a cross-section. Any such peak may be a local maximum of the surface portion for an at least 1 micron long region in the cross-section. Alternatively or in addition, any such valley may be a local minimum of the surface portion for an at least 1 micron long region in the cross-section. In an embodiment, a surface figure of at least one surface portion is 5.0 microns or less (e.g., wherein an average peak-to-valley surface figure is 3.0 microns or less). The term "surface figure" refers herein to surface irregularity as determined according to the above-described calculations.

In utilizing a combination of molding to form some surfaces of an eyepiece (e.g., including interior interface surfaces) and machining to shape, at least in part, other surfaces of the eyepiece, some embodiments are capable of meeting relatively more rigorous manufacturing tolerances, as compared to alternative manufacturing techniques. Failure to meet such manufacturing tolerances may result in image artifacts that significantly impact the quality of a display that is to be provided using the eyepiece. Furthermore, such embodiments are highly scalable and adaptable to being efficiently implemented in an existing supply chain for manufacturing conventional eyeglasses.

Certain features of various embodiments are described herein with reference to processing of a lens blank having an outcoupling structure formed at a stepped interface where a molded surface portion of a first blank body is mated with a molded surface portion of a second blank body. However such discussion may be extended to additionally or alternatively apply to processing of a lens blank having any of other various outcoupling structures. A lens blank processed according to some embodiments may omit any such stepped interface and/or may include an outcoupling structure other than any that is formed at a stepped interface. For example, a lens blank in one embodiment may include an outcoupling structure at an interface between mated surfaces of respective blank bodies, wherein such mated surfaces, one concave, one convex, each conform to a spherical (or other) shape.

FIG. 1 shows in an exploded view of a system 100, according to an embodiment, for processing a lens blank to form an eyepiece at least in part. In the embodiment shown, system 100 includes an assembly 104 comprising a lens blank 102 and structures to at least partially secure lens blank 102 during some or all such processing. By way of illustration and not limitation, such structures may include a mount plate 150 and one or more blocking structures 152 each to couple to a respective portion of lens blank 102. However, assembly 104 may include any of a variety of one or more additional or alternative blocking structures, according to different embodiments. Although some embodiments are not limited in this regard, system 100 may further comprise equipment (e.g., including the illustrative cutting tool 160) that is operable to cut, grind or otherwise machine one or more surfaces of lens blank 102. During such machining, mount plate 150 and the one or more blocking structures 152 may mitigate forces that would otherwise stress one or more structures of lens blank 102.

Lens blank 102 may include multiple components—e.g., including the illustrative blank body 120 and blank body 130—which are bonded together to form a stock piece (or "puck") that may be adaptable for machine processing to form any of a variety of types of lens shapes. Blank bodies 120, 130 may comprise a transparent optical grade plastic (e.g., a polycarbonate such as EP5000, a polyester such as OKP-1 or OKP-4, etc.) and/or any of a variety of other light transmissive materials used in conventional optical lenses. One or more surface figure properties of blank body 120 and/or blank body 130 may be characteristic of formation by molding processes. For example, one or both of blank bodies 120, 130 are formed by molding processes, such as injection molding, prior to an adhering or other bonding of blank bodies 120, 130 to form lens blank 102. Due to such molding, an average surface figure (an irregularity measure of peak to valley height) of blank body 120 and/or of blank body 130 may be 5.0 microns or less, for example. In some embodiments, such an average surface figure is 3.0 microns or less. Lens blank 102 is merely one example of a lens blank from which a curved eyepiece may be shaped. Lens blank 102 may include one or more structures that are not shown in FIG. 1. Alternatively or in addition, structures formed in or on lens blank 102 may be different in various embodiments—e.g., wherein a step structure (not shown) is formed on one of surfaces 122, 132 and/or wherein blank bodies 120, 130 form a flat edge surface which extends around a perimeter of lens blank 102.

Structures of blank body 120 and blank body 130 may facilitate a subsequent formation of a lens surface and a lightguide of an eyepiece—e.g., using tool 160. For example, blank body 120 may include a surface 122 as well as other surface portions 124, 126, 128 that are variously opposite surface 122. Similarly, blank body 130 may include a surface 132 as well as other surface portions 134, 136, 138 that are variously opposite surface 132. An exterior of lens blank 102 may be formed at least in part by shaping of sides 122, 132—e.g., wherein surface portions 124, 126, 128 are variously coupled each to a respective one of surface portions 134, 136, 138 in an interior of lens blank 102. In the illustrative embodiment shown, surface portions 126, 136 form respective step structures of blank bodies 120, 130. By way of illustration and not limitation, surface portions 124, 128 may each conform to a different respective plane or curve—e.g., wherein one or both of surface portions 124, 128 are variously curved each along one or more respective dimensions. In such an embodiment, surface portion 126 may be disposed between surface portions 124, 128 and may transition between (and deviate from) the respective curves or planes to which surface portions 124, 128 variously conform. Similarly, surface portion 136 may be disposed between surface portions 134, 138 and may transition between the respective curves or planes to which surface portions 134, 138 variously conform. In other embodiments, blank bodies 120, 130 do not form any internal stepped interface structure and/or do not form any external stepped surface structure.

In an embodiment, surface portions 126, 136 are respective molded surface portions (or at least comprise respective molded surface sub-portions) that conform to the same plane or curve—e.g., wherein surface portions 126, 136 are complementary to one another. Similarly, surface portions 124, 134 may include at least respective molded surface sub-portions that are complementary to one another and/or surface portions 128, 138 may include at least respective molded surface sub-portions that are complementary to one another. Processing of lens blank 102 with tool 106 (or other such machining equipment) may selectively remove portions of surfaces 122, 132, where such removal is to form, at least in part, opposite sides of a lens structure. In the embodiment shown, surface 122 may be shaped to form a world-side of an eyepiece—e.g., wherein surface 132 is shaped to form an eye-side of such an eyepiece. In this particular context, "eye-side" (or "eye-ward facing") refers to a side of an eyepiece that is to be facing toward—and closest to—an eye of a user, wherein "world-side" (or "world facing") refers to an opposite side of the eyepiece that is to be facing away from the user's eye.

Structures internal to lens blank 102 may contribute to the formation of a lightguide in the eyepiece. By way of illustration and not limitation, lens blank 102 may have formed thereon an input structure (such as the illustrative facet 140 of blank body 130) that, in combination with the interface between surface portions 126, 136, is to facilitate a lightguide functionality of such an eyepiece. For an eyepiece formed from lens blank 102, a portion of facet 140 may receive light from a display device that is to be optically coupled to the eyepiece, where such light is subsequently redirected out of the eyepiece by an optical combiner disposed at an interface of surface portions 126, 136.

Figure 2:
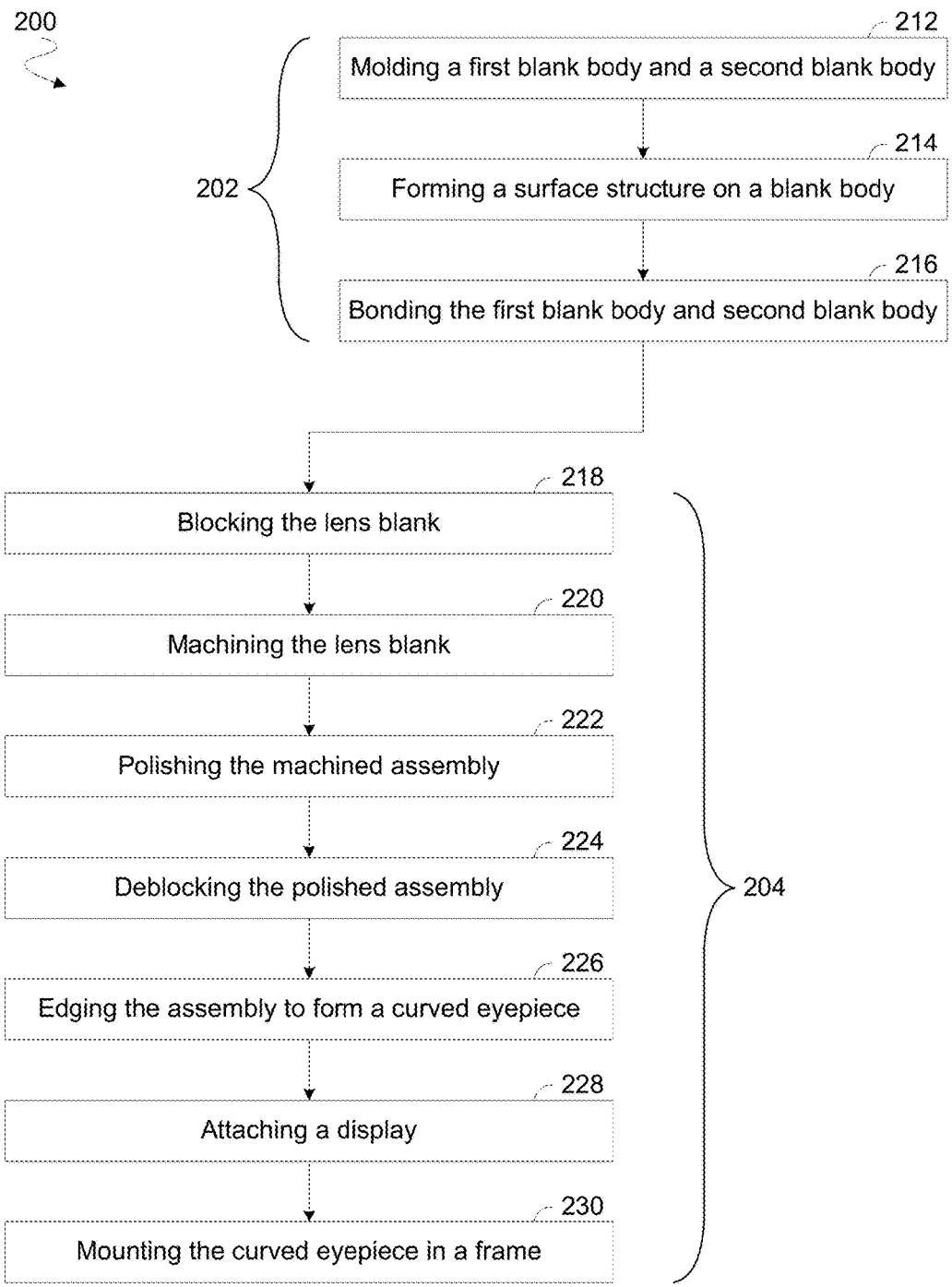
FIG. 2 is a flow diagram illustrating elements of a method for forming a curved eyepiece according to an embodiment.

FIG. 2 illustrates elements of a method 200 to process a lens blank according to an embodiment. Method 200 may be performed with one or more components of system 100. The lens blank may have some or all of the features of lens blank 102—e.g., wherein the lens blank includes molded blank bodies that are bonded together to form a stepped interface structure and/or other lightguide features.

Figure 3:
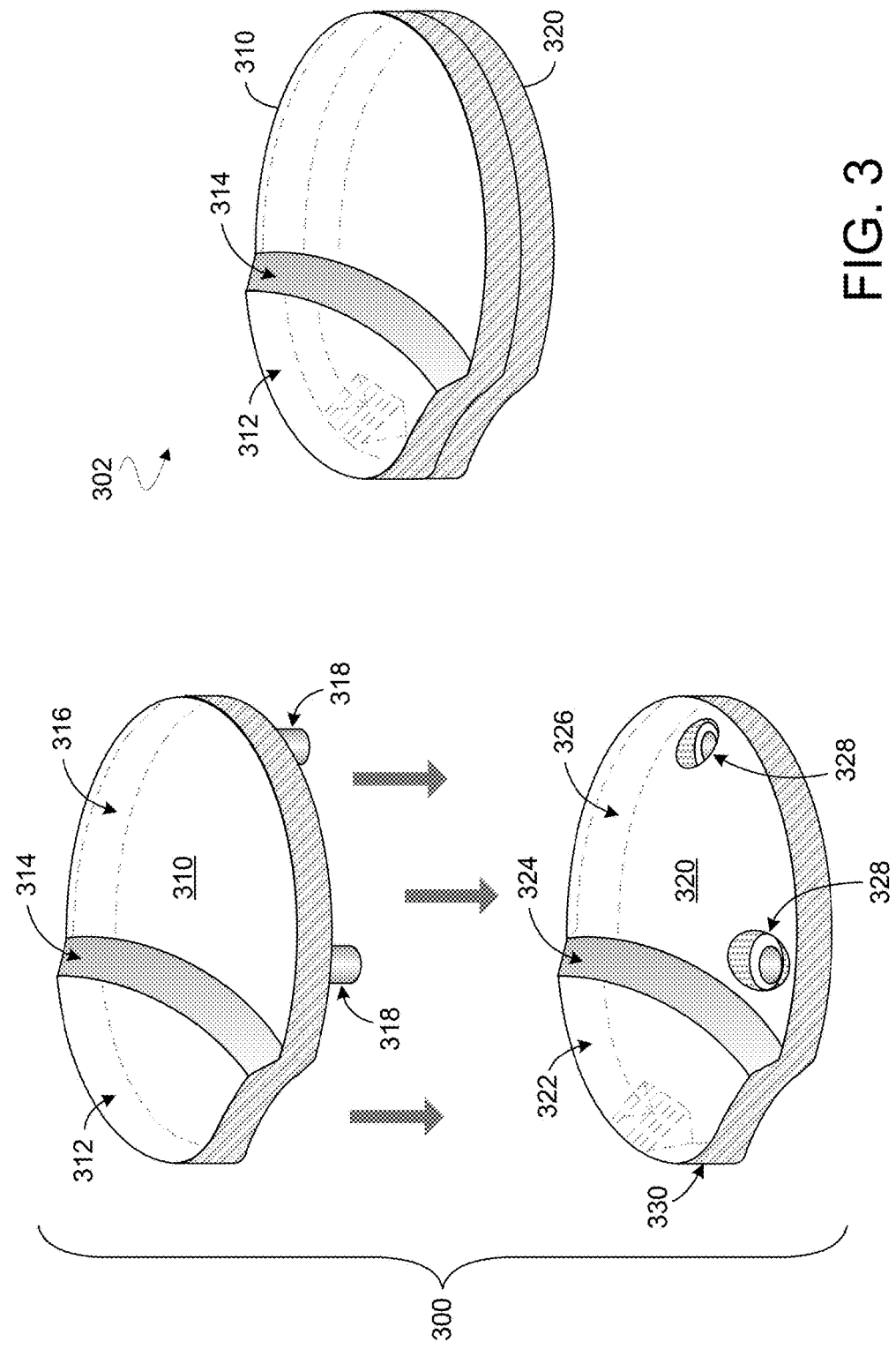
FIG. 3 illustrates features of a lens blank to be shaped into an eyepiece according to an embodiment.

To illustrate certain features of various embodiments, method 200 is described herein with reference to a lens blank that is represented in FIG. 3. Method 200 is also described herein with reference to other example embodiments of a blank body 400 of FIG. 4, stages 500-505 of processing represented in FIG. 5 and a blocked assembly comprising a blank body 600 of FIG. 6. However, such description may be extended to apply to any of a variety of additional or alternative lens blank structures and/or operations to form an eyepiece from such lens blank structures.

In an embodiment, method 200 comprises operations 204 to form an eyepiece, at least in part, by machining a lens blank which includes multiple blank bodies that have been bonded together. For example, operations 204 may include, at 218, blocking the lens blank with one or more structures that are to mitigate mechanical stress on some or all such blank bodies. As used herein, "blocking" refers to the mechanical reinforcement of structures of a lens blank—e.g., to facilitate movement of the lens blank and/or the application of forces to the lens blank during machining thereof. Corresponding, "deblocking" refers herein to the decoupling of such reinforcement structures. A blocking structure of metal, wax, plastic and/or any of various other suitable materials may function as a jig to resist forces applied to a lens blank, to facilitate manipulation of the lens blank and/or to provide a guide or a guard for determining an extent of machining of the lens blank. Form fitted blocking structures may reduce an amount of blocking media that is used to adequately hold a lens blank and/or may reduce thermal changes in the lens blank that might otherwise result from subsequent machining processes.

The blocking at 218 may include coupling the lens blank to one or more blocking structures, wherein the lens blank includes a first blank body and a second blank body. In an embodiment, the first blank body and second blank body form respective step portions which are positioned opposite one another (and, for example, may adjoin one another). In some embodiments, the first blank body and the second blank body have respective features which are characteristic of being formed by a molding process—e.g., wherein respective surface portions of such blank bodies (e.g., at least respective surface portions at an interface between the blank bodies) each have a respective surface figure that is 5.0 microns or less.

The blocking at 218 may include one or more processes adapted from conventional techniques for blocking a homogeneous block of lens blank material. In an embodiment, the blocking at 218 includes molding a metal alloy onto a surface portion of the lens blank, or heating a preformed wax (or other) cast to adhere to such a surface portion. Alternatively or in addition, one or more adhesive pads may be applied to the surface of the lens blank—e.g., to facilitate affixing the lens blank to mount plate 150 or other such structure. The one or more blocking structures may implement pressure blocking and/or suction blocking, for example. In one embodiment, at least one blank body is only indirectly coupled to any blocking structure that is to resist forces from at least one particular machining process—e.g., wherein, of the first blank body and the second blank body, one such blank body is only indirectly coupled to any such blocking structures via the other such blank body. Blocking structures used to support a particular round of machining may be only indirectly coupled to a blank body that is not going to be shaped by that round of machining. Such an indirect coupling allows for a reduction of stresses that might otherwise be imparted on the stepped interface between the blank bodies.

Referring now to the example embodiments of FIG. 3, views 300, 302 illustrate features of a lens blank to be processed according to an embodiment. As shown in exploded view 300, the lens blank may include a blank body 310 and another blank body 320. Blank body 310 may include portions 312, 314, 316 that are to be aligned with respective portions 322, 324, 326 of blank body 320. Portion 314 may form a step structure between portions 312, 318—e.g., wherein portion 324 forms another step structure between portions 322, 328. Although some embodiments are not limited in this regard, the step structure formed with portion 314 may include a stepped (and in some embodiments, molded) surface portion at an exterior side of the lens blank. Alternatively or in addition, the step structure formed with portion 324 may include another stepped (and in some embodiments, molded) surface portion at an opposite exterior side of the lens blank.

Blank bodies 310, 320 may include or couple to one or more respective structures to aid in alignment for forming the lens blank. By way of illustration and not limitation, blank body 310 may form alignment pins 318 that are received each into a corresponding one of holes 328 variously extending at least partially through blank body 320. The particular number, shape, sizes and distribution of alignment pins 318 and holes 328 in lens bodies 310, 320 is merely illustrative. Blank bodies 310, 320 may include any of a variety of additional, alternative and/or differently arranged alignment structures, in other embodiments.

In some embodiments, one or both of blank bodies 310, 320 have formed thereon one or more markers (not shown) or other such alignment structures to indicate a desired positioning of blank bodies 310, 320 to one another. Alternatively or in addition, such markers and/or other structures may indicate a position, shape, orientation and/or other characteristic of lightguide structures that are internal to the lens block after formation thereof.

As shown by assembled view 302, insertion of alignment pins 318 each into a respective one of holes 328 may allow for opposite surfaces of blank bodies 310, 320 to be adjoined and adhered to one another. For example, portions 312, 322 may comprise respective molded surface portions that are to be mated with each other, where portions 314, 324 also comprise respective molded surface portions that are to be mated with each other. Such adhering may result in formation of an optical combiner structure at an interface of portions 314, 324. In an eyepiece to be formed from the lens blank, the optical combiner may redirect display light that is received via a facet or other such in coupler surface at an edge of the eyepiece. For example, such a facet may be molded or otherwise formed in an edge 330 of blank body 320 prior to bonding of blank bodies 310, 320 to each other.

Figure 4:
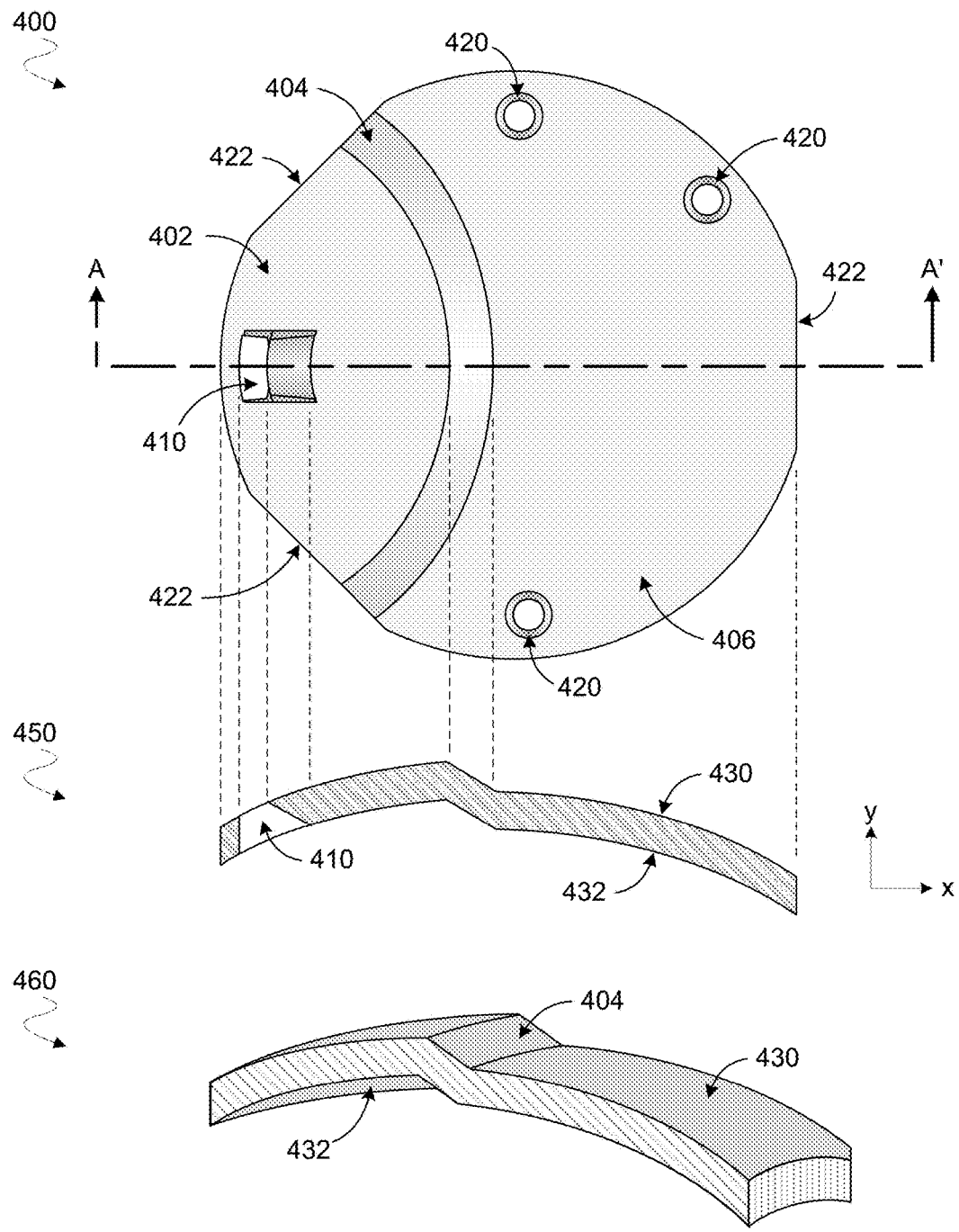
FIG. 4 shows various views of a blank body to be machined according to an embodiment.

FIG. 4 shows a plan view of a blank body 400 according to an embodiment that, for example, includes some or all features of blank body 320. Blank body 400 may include portions 402, 404, 406 that, in an embodiment, correspond to portions 322, 324, 326, respectively. Blank body 400 may include structures to facilitate alignment with another blank body for the formation of a lens blank. Alternatively or in addition, some or all such structures may facilitate the positioning of the lens blank relative to one or more blocking structures and/or relative to a cutter, grinder, polishing tool and/or other machining equipment that is to assist in the formation of an eyepiece from the lens blank. Examples of such alignment structures include, but are not limited to, some or all of the flat sections 422 (variously formed at an edge of blank body 400) and alignment holes 420 shown. However, blank body 400 may include any of a variety of configurations of fewer, more and/or different alignment structures, in other embodiments.

FIG. 4 also shows a cross-sectional side view 450 of blank body 400 along a plane A-A.' As shown in view 450, portion 404 may form a step structure that extends to at least one of two opposing sides 430, 432 of blank body 400. As illustrated in the cross-sectional perspective view 460 shown, some or all of portions 402, 404, 406 may each form one or more respective curved surfaces each on corresponding one of sides 430, 432. In some embodiments, blank body 400 has formed therein a notch or other such structure (such as the illustrative hole 410) that extends at least partially into portion 402. Hole 410 may be defined at least in part by a structure, such as facet 140, from which is to be formed an optical input through which display light may be received by an eyepiece.

Figure 6:
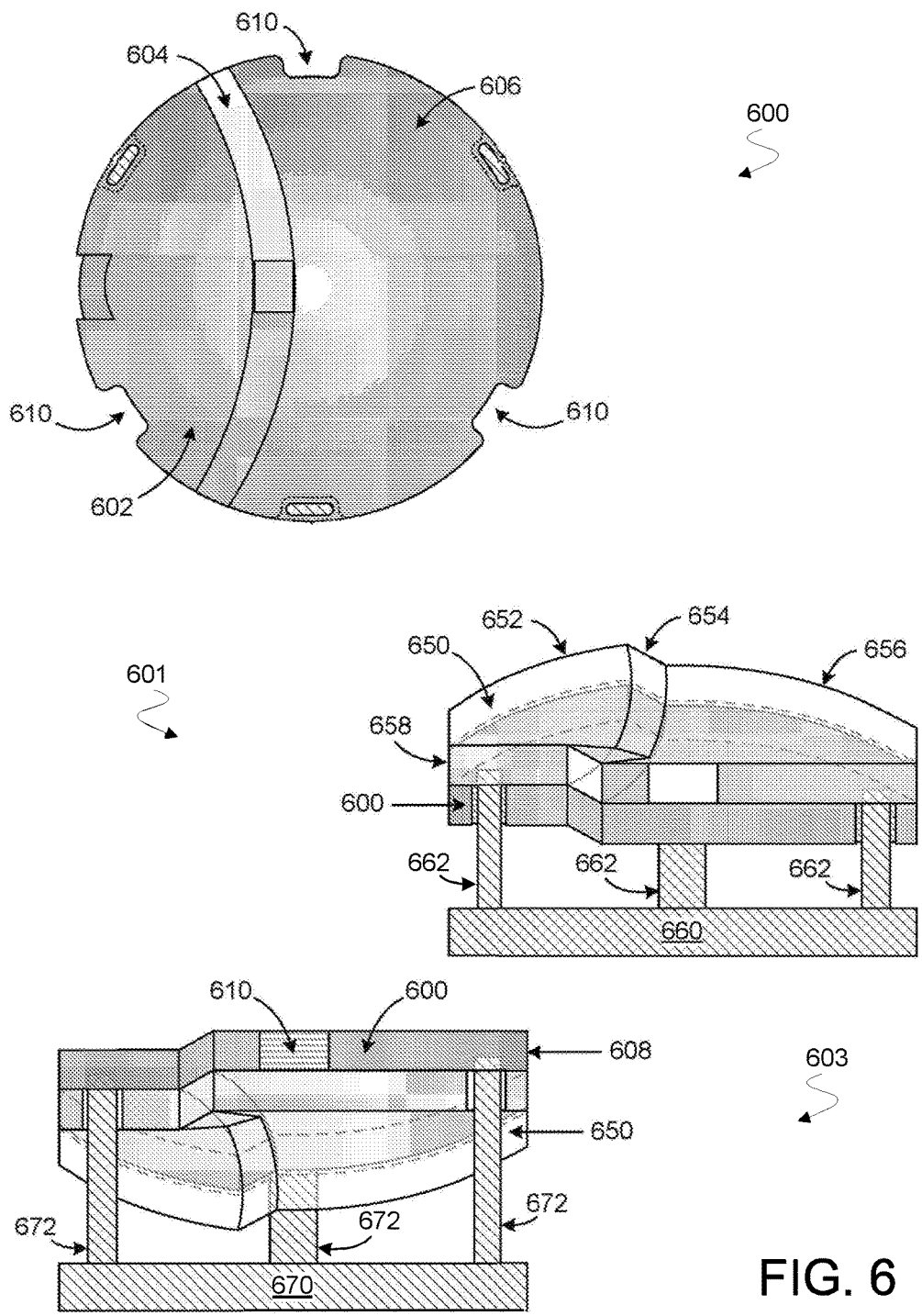
FIG. 6 shows side views of respective blocking assemblies each for forming a curved eyepiece according to a corresponding embodiment.

FIG. 6 shows a blank body 600 to be shaped by eyepiece manufacturing processes according to an embodiment. Blank body 600 may include portions 602, 606 and a stepped portion 604 disposed between portions 602, 606—e.g., wherein portions 602, 604, 606 correspond to the respective portions 322, 324, 326 of blank body 320. FIG. 6 also shows in side view a blocked assembly 601 for processing of a lens blank which comprises both blank body 600 and another blank body 650. For example, blank bodies 600, 650 may have some or all of the respective features of blank bodies 310, 320. Blocked assembly 601 may facilitate machining to shape an exterior side of blank body 650. Such shaping may remove a step structure 654 formed at exterior side between adjoining portions 652, 656 of the exterior side.

Blocked assembly 601 is merely one example of an arrangement according to an embodiment wherein at least one blank body (or a remaining portion thereof) is only indirectly coupled to any blocking structures—e.g., via the other blank body. By way of illustration and not limitation, one or more blocking structures 662 of blocked assembly 601 may variously extend from a base 660 and further extend past—e.g., through or around—blank body 600 to couple directly to blank body 650 (where such one or more blocking structures 662 avoid directly contacting blank body 600). For example, one or more blocking structures 662 may each extend through a respective recess 610 formed at a periphery of blank body 600 and into a corresponding one of various holes formed in blank body 650. Alternatively or in addition, one or more other blocking structures (not shown) may extend outside a periphery of blank body 600 and couple to at least a portion of a peripheral edge 658 of blank body 650.

FIG. 6 also shows a side view of another blocked assembly 603 for additional or alternative processing of the lens blank. Blocked assembly 603 may facilitate machining to shape blank body 600—e.g., where such machining partially removes stepped portion 604. Blocked assembly 603 is an example of another arrangement wherein one blank body (or a remaining portion thereof) is only indirectly coupled to any blocking structures. For example, one or more blocking structures 672 may variously extend from a base 670 and further extend past blank body 650—without contacting blank body 650—to couple directly to blank body 600. In the illustrative embodiment shown, blank body 650 includes various recesses, similar to recesses 610, to accommodate such extension of the one or more blocking structures 672. Additional or alternative blocking structures (not shown) may extend past blank body 600 and couple to a peripheral edge 608 of blank body 600.

Referring again to FIG. 2, operations 204 may further comprise, at 220, machining the lens blank while it is blocked. The machining at 220 may include cutting, grinding or other shaping (also referred to as "generating") to form an assembly including respective remaining portions of the first blank body and the second blank body. In an embodiment, such machining includes one or more processes adapted from conventional techniques for shaping a homogenous block of lens blank material—e.g., using a diamond wheel, fly cutter and/or any of a variety of other generating tools.

One or more surfaces of the assembly may at least approximate a lens shape that, for example, may be further formed by subsequent polishing. For example, the machining at 220 may form at least in part a convex side of the assembly, wherein the convex side corresponds to a world-side of an eyepiece that is to be formed from the assembly. Another (e.g., concave) side formed by shaping of the assembly may correspond to an eye-side of such an eyepiece. In some embodiments, the machining at 220 includes an initial rough milling to reduce stresses that are internal to one or more blank bodies of the lens blank.

The machining at 220 may be in response to a controller that operates tool 160 (or other such equipment)—e.g., wherein hardware and/or executing software of the controller implements a machining control algorithm that is open-loop or, alternatively, closed-loop. In open-loop machining control, a cutter or other such generating tool may follow a predefined path that is not changed in response to any analysis of the assembly performed during machining of the lens blank. In closed-loop machining control, the controller may include or otherwise access mechanical, optical or other sensors that are used to detect specific alignment features of the lens blank, wherein the tool path is adaptively changed based on such alignment features during generation of the assembly surface. Such sensing may include, for example, deflectometry at an ultraviolet (UV) wavelength to measure a current shape of a machined surface. Accuracy of open-loop machining may rely upon an initial alignment of the lens blank being correct and unchanging. Accordingly, accuracy of open-loop machining may be relatively more susceptible to errors based on the stacked tolerances of lens blank components, blocking structures and machining equipment components.

Figure 5A:
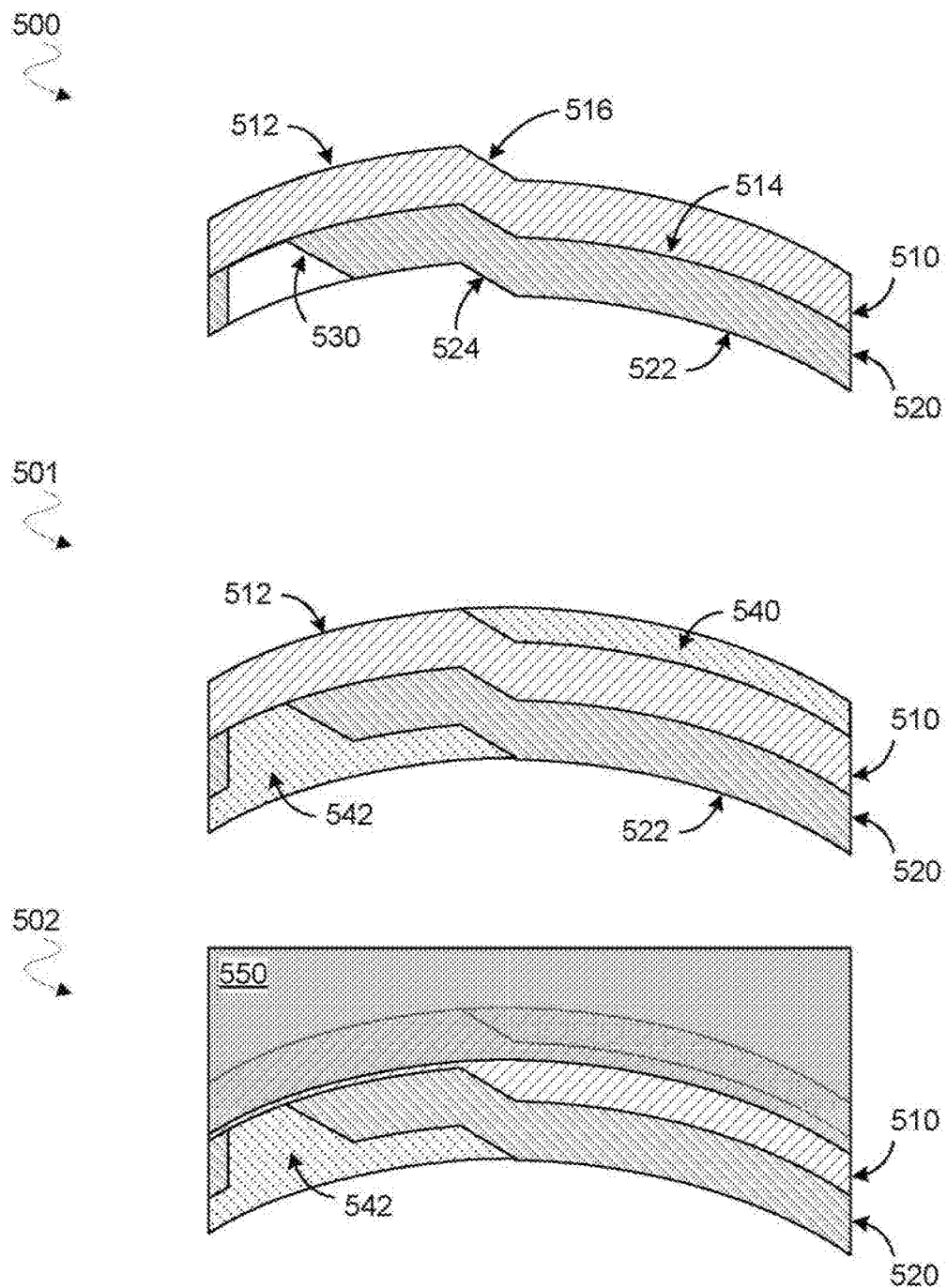
FIGS. 5A, 5B shows cross-sectional diagrams of structures during processing to form a curved eyepiece according to an embodiment.
Figure 5B:
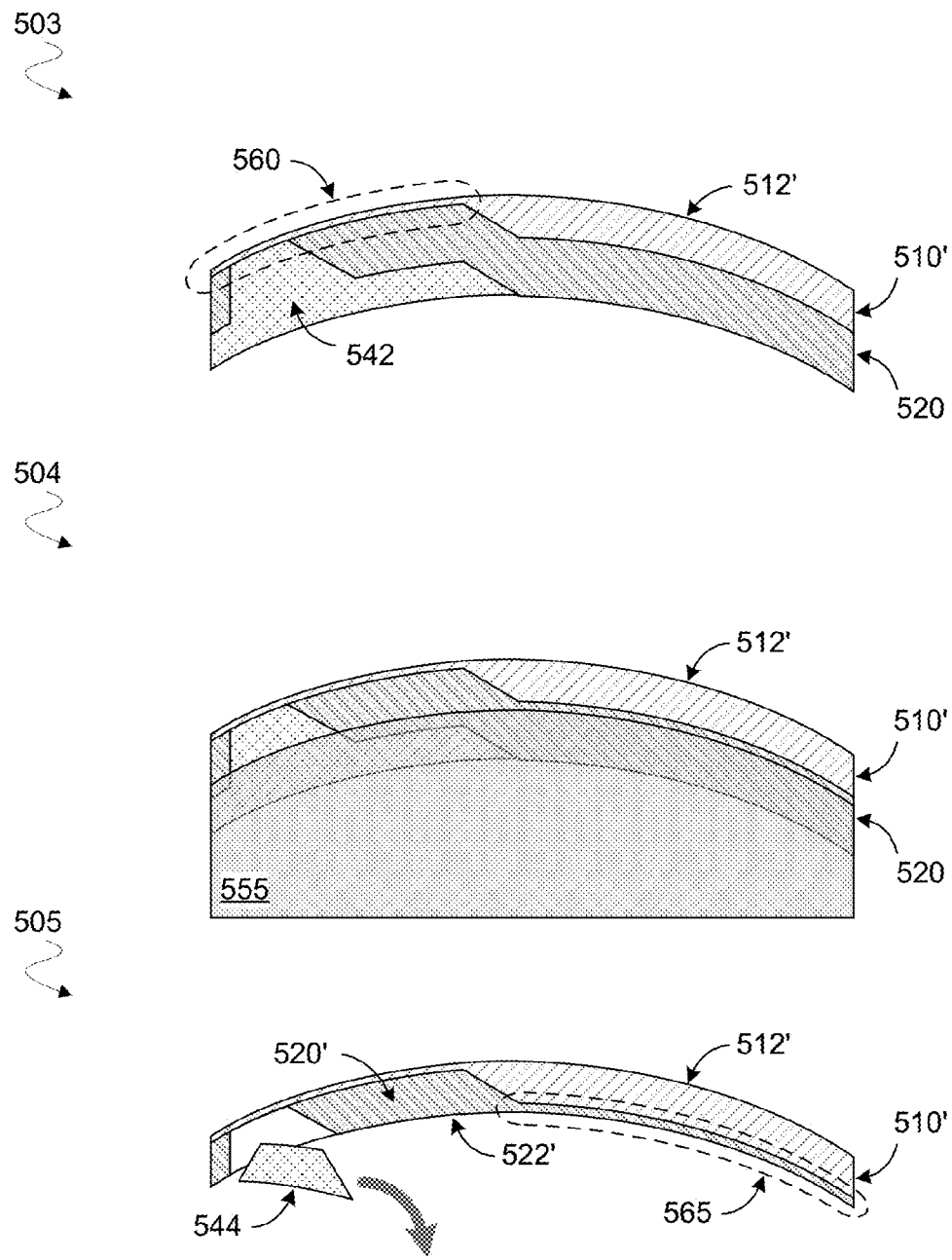

In the example embodiment of processing shown by FIGS. 5A, 5B, a lens blank includes blank bodies 510, 520. The processing may form from blank bodies 510, 520 a world-side and an eye-side (respectively) of an eyepiece that is generated with the lens blank. In such an embodiment, a facet 530 of blank body 520 may eventually facilitate the receiving of display light at such an eyepiece.

As shown at stage 500, a stepped portion 516 of blank body 510 may couple to a stepped portion 524 of blank body 520 to form a stepped interface 514. Although some embodiments are not limited in this regard, stepped portion 516 may extend to include, at a side 512 of blank body 510, a step structure which forms part of an exterior of the lens blank. Alternatively or in addition, stepped portion 524 may extend to form, at a side 522 of blank body 520, a step structure which forms another part of the lens blank exterior.

To accommodate subsequent machining of the lens blank, filler material may be disposed adjacent to some or all such exterior step structures. For example, as shown at stage 501, a layer 540 of filler material may be injection molded or otherwise disposed onto at least a portion of side 512. Alternatively or in addition, another layer 542 of filler material may be disposed onto at least a portion of side 514. One or both of layers 540, 542 may comprise any of a variety of polyurethanes, silicones, epoxy resins and/or other materials suitable to mitigate mechanical stresses while a machining tool transitions onto or away from a step structure at a corresponding one of sides 512, 522. One or both of layers 540, 542 may be molded or otherwise deposited at any of a variety of stages prior to or during lens blank processing, according to various embodiments.

Stage 502 illustrates an example of a region 550 where a cutting tool, grinder and/or other such equipment may operate to remove lens blank material and shape, at least in part, a world-side of the eyepiece. As illustrated by stage 503 of FIG. 5B, removal of material in region 550 may expose a side 512' of a remaining portion 510' of blank body 510. In some embodiments, remaining portion 510' forms an overlap structure 560 that extends over blank body 520 in a region past the stepped structure of interface 514. Overlap structure 560 may have an average thickness that is equal to or less than 1 mm (e.g., 500 microns or less). The average thickness may be equal to or less than 300 microns (e.g., 200 microns or less), for example.

Stage 504 shows a region 555 where lens blank material is similarly removed to at least partially shape an eye-side of the eyepiece. As shown at stage 505, such shaping may expose a side 522' of a remaining portion 520' of blank body 520. In some embodiments, remaining portion 520' includes an overlap structure 565 that extends past the stepped region of interface 514—e.g., wherein an average thickness of overlap structure 560 is equal to or less than 1 millimeter (e.g., less than 500 microns). The average thickness of overlap structure 560 may be equal to or less than 300 microns (e.g., less than 200 microns), for example. During or after the shaping to expose side 522', a remaining portion 544 of layer 542 may be removed to expose a remaining portion of facet 530—e.g., wherein portion 544 protects that portion of facet 530 during machining of the lens blank and (in some embodiments) polishing of the assembly formed at stage 504.

Referring again to FIG. 2, method 200 may further perform, at 222, a polishing of the assembly that is formed by the machining 220. The polishing at 222 may smooth at least a portion of an exterior surface of the assembly—e.g., whereby the surface portion is given a clear surface and/or more closely conforms to a curve for improved optical quality. In an embodiment, the polishing at 222 removes artifacts, such as surface variation, that result from relatively more course machining performed at 220.

After the polishing at 222, method 200 may perform a deblocking of the polished assembly, at 224. The deblocking at 224 may include removal from the assembly of one or more blocking structures that, for example, were previously coupled to the lens blank at 218. This removal may comprise one or more operations adapted from conventional techniques to deblock a homogeneous block of a lens blank material. In an embodiment, heat may be applied at 222 to at least partially melt an alloy, wax, plastic or other material of one or more blocking structures. For example, a hot water bath may be used to facilitate separation of blocking structures from the assembly. Alternatively or in addition, a blocking structure may be broken from the assembly by striking against a hard surface.

In some embodiments, operations 204 include successive rounds of machining each to shape a different respective side of the lens blank. Such rounds of machining may be variously facilitated with the same blocking structures or, alternatively, with different respective blocking structures. By way of illustration and not limitation, the machining at 220 and polishing at 222 may shape a first side of the assembly, wherein operations 204 further include additional processing to shape a second side of the assembly (opposite the first side). In such an embodiment, at least some blocking structures may be deblocked from a partially-shaped assembly after a first round of machining—e.g., wherein at least some other blocking structures are then coupled to the partially-shaped assembly prior to a second round of machining.

The operations 204 may further include, at 226, edging the assembly to form a curved eyepiece. The edging at 226 may include cutting the assembly to form a desired outer contour of an eyepiece. For example, a controller may operate an edging tool based on sensor information identifying respective locations of reference points (e.g., of one or more alignment structures) and predetermined reference information identifying a configuration of such reference points relative to a step interface structure within the assembly. Such information may identify a desired configuration of an input facet, lightguide, step interface or other structure of the eyepiece relative to a frame that is to receive the eyepiece. Similar sensor information and reference information may be additionally or alternatively used as a basis for controlling the machining at 220 and/or the polishing at 222.

In some embodiments, the edging at 226 includes forming one or more holes, posts and/or other structures of the eyepiece to facilitate coupling of the eyepiece with a display and/or a frame. Alternatively or in addition, edging may include forming, in at least a portion of the edge, a rough textured surface that is to provide for diffuse scattering of light. Such texturing may mitigate a degradation of display resolution that might otherwise take place due to interactions of display light with a smooth, molded surface portion of the eyepiece. Method 200 may omit the edging at 226 in some embodiments where, for example, the original lens blank has the same profile as the final eyepiece.

Although some embodiments are not limited in this regard, operations 204 may further couple the eyepiece to one or more other structures. For example, method 200 may, at 228, attach the eyepiece, directly or indirectly, to a display that is for directing light into the eyepiece. Alternatively or in addition, the eyepiece may be glued, snapped and/or otherwise mounted into an eyeglass frame, at 230.

Figure 7A:
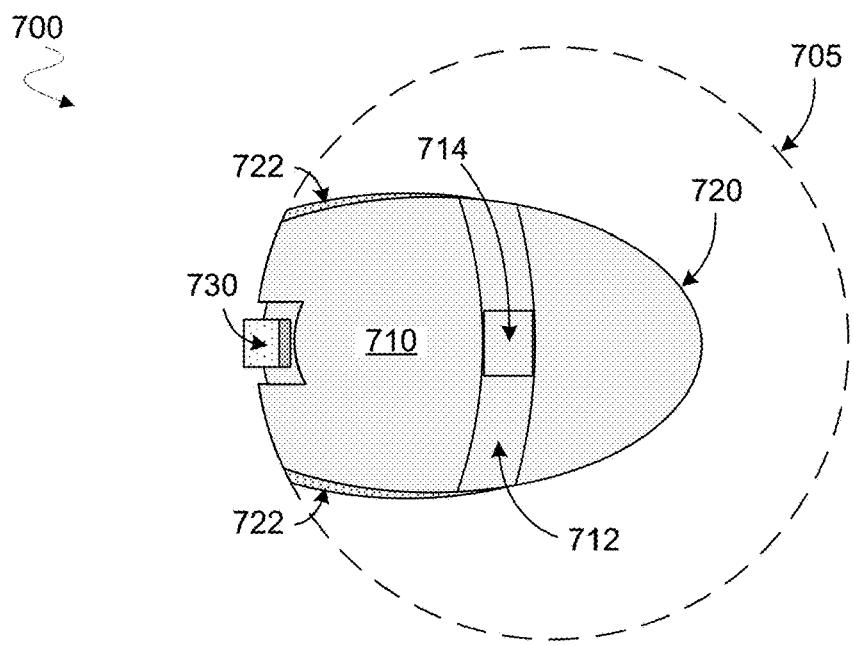
FIGS. 7A, 7B show plan views each of a respective curved eyepiece manufactured according to a corresponding embodiment.
Figure 7B:
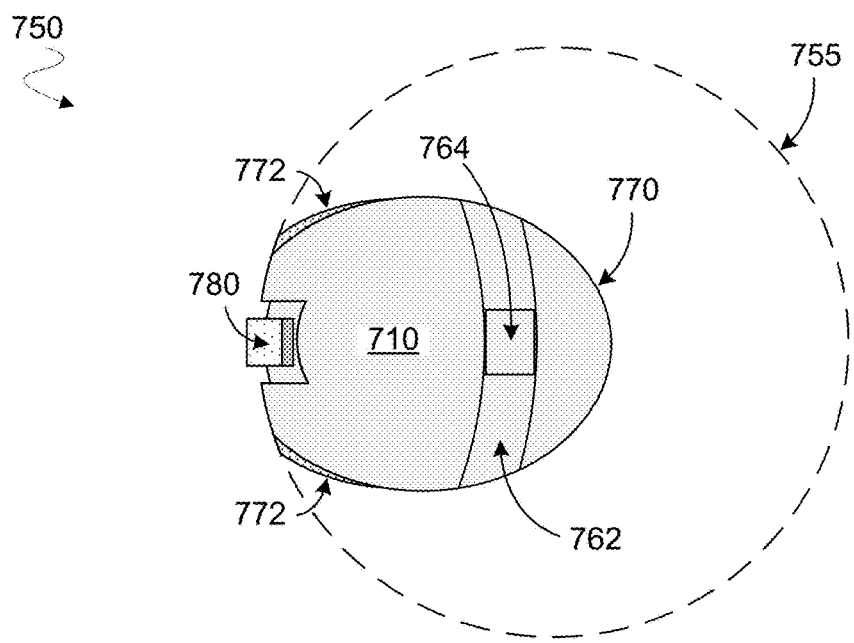

Example embodiments of edging and attaching processes—such as those variously performed at 226 and 228—are illustrated in FIGS. 7A, 7B. FIG. 7A shows an optical system 700 including an eyepiece 710 and a display panel 730 coupled thereto. In the example embodiment shown, display panel 730 is positioned to direct display light into a lightguide that extends within eyepiece 710 from a facet at a side of eyepiece 710 to stepped interface 712 formed between lens bodies of eyepiece 710. Stepped interface 712 may have formed therein or thereon an outcoupling structure to direct such display light via a viewing region 714 out from a side of eyepiece 710. Eyepiece 710 may be formed from a lens blank having a cross-sectional profile that, for example, conforms at least in part to the curve 705 shown. An outer contour 720 of lens 710 may be formed by the edging at 226, or other such processing. In some embodiments, contour 720 defines decorative, personalized and/or other features, such as the illustrative bevels 722 shown.

FIG. 7B shows an optical system 750 according to another embodiment. Eyepiece 760 may be formed, for example, from a lens blank having a cross-sectional profile conforming to the illustrative curve 755. In the embodiment shown, contour 770 defines bevels 772 and/or any of a variety of other such decorative structures. Optical system 750 may include an eyepiece 760 and a display panel 780 coupled thereto. Display panel 780 may be positioned to direct display light into a lightguide extending within eyepiece 760. Such light may be redirected by a stepped interface 762, within eyepiece 760, out from a viewing region 764 at an eye-side surface of eyepiece 760.

Although some embodiments are not limited in this regard, method 200 may further comprise operations 202 to form the lens blank that is to be subsequently machined by operations 204. For example, operations 202 may include, at 212, molding the first blank body and the second blank body of the lens blank. The molding at 212 may include performing an injection mold to form blank body structures including, for example, a step interface portion and, in some embodiments, a facet that is to eventually serve as an input for an eyepiece to receive display light. Injection molded eye-side and world-side blank bodies may be variously composed of any of a variety low-birefringence, high-index of optical plastics or other materials—e.g., adapted from conventional ophthalmic devices.

The molded blank bodies may be complementary to one another to facilitate bonding for forming an ophthalmic puck that, for example, has a largest width (e.g., a diameter) that is in a range from between 60 millimeters (mm) and 90 mm. However, width, depth and/or other dimensions of the puck may vary in different embodiments according to implementation specific details. In one embodiment, a blank body has a thickness in one dimension that has a consistency across another dimension which mitigates deformation that might otherwise occur during cooling, curing and or other processing stages of the blank body. By way of illustration and not limitation, cross-sectional side view 450 shows a y-axis thickness of blank body 400 that has a consistency across an x-axis range (perpendicular to the y-axis) which a cross-section of blank body 400 spans. For example, the y-axis thickness of blank body 400 may, across at least 90% of such an x-axis span, be within 10% of an average thickness. In some embodiments, the y-axis thickness of blank body 400 is within 5% of an average thickness, for at least 90% (e.g., 95% or more) of such an x-axis span.

Injection molding may further form one or more structures to facilitate alignment of the blank bodies with one another. Such alignment structures may include any of a variety of fiducial markers, pins, holes and/or the like. In some embodiments, some or all such alignment structures are additionally or alternatively used as references for one or more of operations 204. Alternatively or in addition, one or both blank bodies may be variously molded to further include any of a variety of structures that are deformable (e.g., flexible) to make up for excessive differences between the respective shapes of the blank bodies.

Any of a variety of heat treatment, annealing and/or other processes may be applied to some or all blank bodies to reduce internal stresses that may be a result of the molding process. Annealing may reduce stress induced birefringence characteristics, for example. Additionally or alternatively, one or more cycles of elevated temperature may cure a coating (e.g., photochromic, hardcoat or the like) that is applied after molding, machining and/or other processes.

In some embodiments, operations 202 further comprise, at 214, forming a surface structure on one of the first blank body and the second blank body prior to a bonding of the two blank bodies to one another (at 216). By way of illustration and not limitation, a step structure formed at an exterior of one of the blank bodies may be coated, textured and/or otherwise processed to have formed therein or thereon a surface that is to facilitate a redirection of display light. A non-polarizing beam splitter coating is one example of a surface structure that may be formed at 214.

In some embodiments, operations 202 also include, at 216, bonding the first blank body and second blank body. The bonding at 216 may be performed with an optical adhesive having an index of refraction that facilitates total internal reflection of display light within an eyepiece that is to be formed from the lens blank. Such adhering may be performed after a plasma cleansing with an ion gun—e.g., to activate surfaces of the lens bodies and/or to remove impurities and contaminants from such surfaces. One or both blank bodies may be modified prior to the bonding at 216—e.g., by a rough milling process to mitigate internal stresses. After the bonding at 216, one or more tape and/or other masking materials may be selectively applied to portions of the lens blank to protect such portions during some or all of operations 204.

Although some embodiments are not limited in this regard, one or both of the blank bodies may be further processed prior to, or after, a bonding of the blank bodies to form a lens blank. Such processing may include marking a blank body (e.g., by stamping, machining, etching, laser marking and/or the like) to indicate one or more structural, optical or other characteristics of the blank body. Such markings may be subsequently located, read or otherwise identified—by a scanner, camera, human eye or the like—as a basis for forming an eyepiece from the lens blank. For example, one or more such markings may be used to evaluate a current alignment, machining and/or other process state.

Figure 8A:
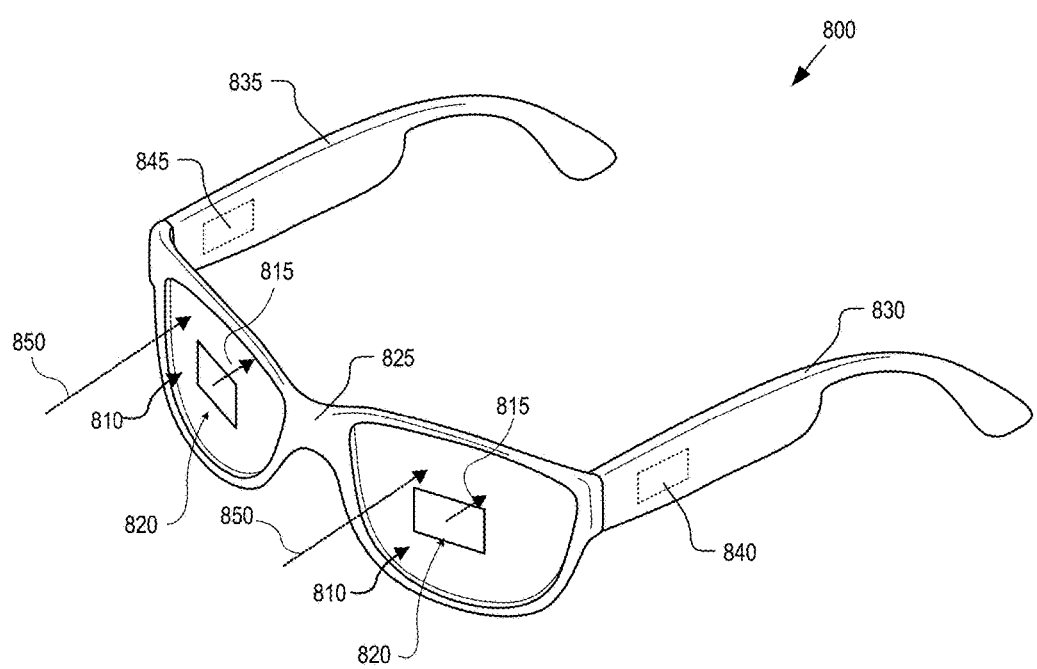
FIG. 8A is a perspective view illustration of a head wearable display including a curved eyepiece fabricated according to an embodiment.
Figure 8B:
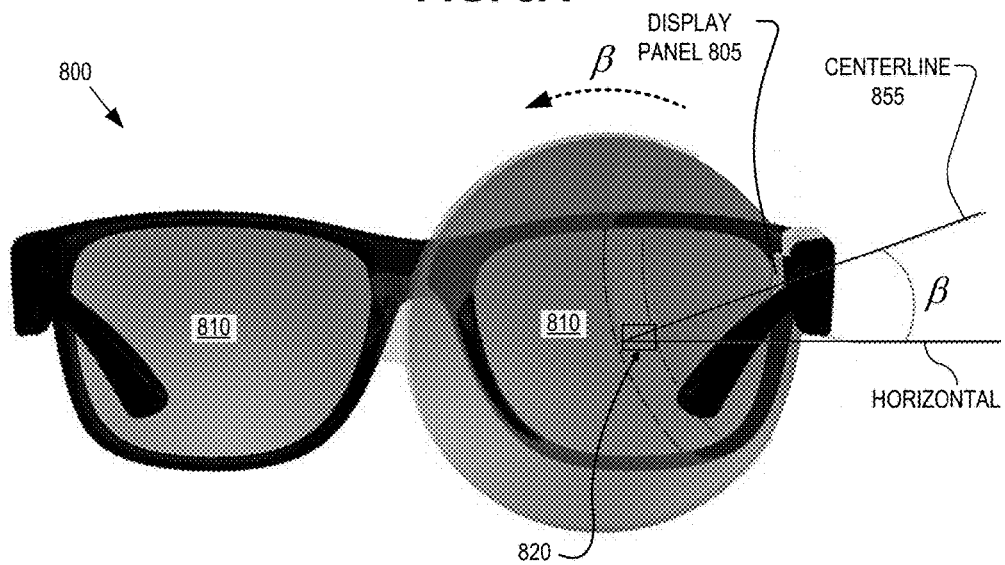
FIG. 8B is a side view illustration of a head wearable display including a curved eyepiece fabricated according to an embodiment.

FIGS. 8A and 8B are illustrations of a head wearable display 800 that incorporates a left and right instance of optical systems each in accordance with a corresponding embodiment. FIG. 8A is a perspective view illustration of head wearable display 800 while FIG. 8B is a side view illustration of the same.

The illustrated embodiment of head wearable display 800 includes left and right instances of curved eyepieces 810. Curved eyepieces 810 are mounted to a frame assembly, which includes a nose bridge 825, left ear arm 830, and right ear arm 835. Interior cavities 840 and 845 within left ear arm 830 and right ear arm 835 may contain any of various electronics including a microdisplay, microprocessor, interfaces, one or more wireless transceivers, a battery, a speaker, a controller, etc. In one embodiment, either of nose bridge 825 or the front facing corners of ear arms 830, 835 may contain a camera module for capturing forward facing images of the external scene or rear facing images of the user's eye(s). Although FIGS. 8A and 8B illustrate a binocular embodiment, head wearable display 800 may also be implemented as a monocular display with only one curved eyepiece 810 aligned with only a single user eye when worn.

FIG. 7B shows an optical system 750 according to another embodiment. Eyepiece 710 may be formed, for example, from a lens blank having a cross-sectional profile conforming to the illustrative curve 755. In the embodiment shown, contour 770 defines bevels 772 and/or any of a variety of other such decorative structures. Optical system 750 may include an eyepiece 710 and a display panel 780 coupled thereto. Display panel 780 may be positioned to direct display light into a lightguide extending within eyepiece 710. Such light may be redirected by a stepped interface 762, within eyepiece 710, out from a viewing region 764 at an eye-side surface of eyepiece 710.

FIG. 8B illustrates how curved eyepiece 810 is rotated by angle β (e.g., 18 degrees) to angle an embedded curved lightguide (illustrated by a centerline 855) and position display panel 805 above viewing region 820, in accordance with an embodiment of the disclosure. Angling the curved lightguide to direct display light 815 along a downward trajectory towards viewing region 820 enables display panel 805 to be positioned in the user's upper temple region within ear arms 830 or 835, which can be advantageous from an industrial design perspective. However, when curved eyepiece 810 is rotated by angle β relative to level, the display image is also rotated by β and therefore not level. To counter-rotate the display image, display panel 805 is also rotated about an axis by a complementary rotation of β, which offsets the rotational effects of rotating the curved lightguide, as illustrated by centerline 855.

FIG. 9A is a cross-sectional illustration of an optical system 900 including an eyepiece fabricated according to an embodiment. The illustrated embodiment of optical system 900 includes a display panel 905, a polarization rotator 910, a prism 915, an adjustable mount 917, and a curved eyepiece 920. The illustrated embodiment of curved eyepiece 920 includes a first lens body 925, in which a curved lightguide 927 is disposed, a second lens body 930, an optical combiner 935, an input surface 940, a world facing surface 945, and an eye-ward facing surface 950. Input surface 940 may be an incoupling structure formed from facet 140, facet 530 or other such structure of a blank body. Optical combiner 935 may be a Fresnel structure, grating, film or other outcoupling structure formed in or on a step structure at a side of lens body 930—e.g., the step structure formed from surface portion 126 or other such stepped structure of a lens blank. FIG. 9B illustrates details of an example prism 915 according to one embodiment.

Optical system 900 is well suited for use with head wearable displays having a near eye configuration. When integrated with a head wearable display, curved eyepiece 920 receives display light 955 generated by display panel 905 through an input surface 940 peripherally located from a viewing region 960 and emits display light 955 along an eye-ward direction in viewing region 960 toward a user's eye 965 within an eyebox 970. In one embodiment, display light 955 is guided within curved lightguide 927 by total internal reflection between input surface 940 and optical combiner 935. In other embodiments, angularly selective reflective coatings (e.g., multi-layer dichroic film stack) may be applied to promote reflections within curved lightguide 927 having sufficient obliqueness while transmitting near normal angles. In the illustrated embodiment, curved eyepiece 920 is see-through allowing the user to see ambient light incident through world facing surface 945.

During operation, display panel 905 generates display light 955 to form a display image (e.g., computer generated image). Display panel 905 may be implemented using a variety of display technologies including liquid crystal ("LC") displays, light emitting diode ("LED") displays, organic LED ("OLED") displays, LC on silicon ("LCoS") displays, or other micro display technologies.

In the illustrated embodiment, display light 955 is optionally directed through a polarization rotator 910. Polarization rotator 910 is orientated to align a linear polarization of display light 955 with a centerline of curved lightguide 927 to reduce asymmetries in birefringence (discussed in greater detail below). In one embodiment, polarization rotator 910 is a half-wave plate rotator with a specified angular rotation about a normal vector (axis 906) of the emission surface of display panel 905. In one embodiment, polarization rotator 910 includes a clear adhesive disposed across both sides to bond prism 915 to display panel 905.

Display light 955 is further directed through prism 915 prior to entering into curved lightguide 927. Prism 915 is disposed proximate to input surface 940 to pre-compensate display light 955 for lateral chromatic aberrations resulting from refractions entering and exiting curved lightguide 927. Lateral chromatic aberration is deleterious to image quality since it causes color components of a color image to separate or offset laterally. Prism 915 is designed to pre-compensate for this chromatic separation. In one demonstrative embodiment, prism 915 has the following characteristics and dimensions: refractive index=1.8, abbe number=29.9, A=5.6±0.1 mm, B=5.0±0.1 mm, C=0.91±0.1 mm, α=19.50±0.150. Of course, other dimensions and characteristics may be implemented.

In the illustrated embodiment, display panel 905 and prism 915 are orientated relative to curved eyepiece 920 such that chief rays 975 of display light 955 output from the pixels of display panel 905 are guided through curved lightguide 927 and directed substantially through the center of eyebox 970. Each pixel of display panel 905 has its own chief ray, which ideally, is the center normal ray projecting out from the given display pixel. Ideally, curved eyepiece 920 is designed such that the chief ray from each pixel passes through a center of eyebox 970 with each chief ray passing through the center at a different angle due to each pixel's different location on display panel 905. In other words, pixel location on display panel 905 is translated into a ray angle at eyebox 970. This ideal scenario provides improved luminance uniformity across eyebox 970. However, the ideal goal may not be achievable in practice. Accordingly, herein we define the chief ray 975 of a given pixel to be a ray emitted from display panel 905 within a cone having a three-degree arc from normal (as measured from an emission surface of display panel 905) for that given pixel. This "chief ray" is close enough to normal for practical implementations. By orientating display panel 905 and prism 915 relative to curved lightguide 927 and designing curved lightguide 927 with appropriate geometries, the display image is perceived to have a high degree of uniform luminance when viewed from eyebox 970 when chief rays 975 pass substantially through a center of eyebox 970. The inclusion of prism 915 facilitates the reduction of the size of input surface 940 along with compensation of axial and lateral chromatic aberrations. In contrast, prism 915 could be omitted by tilting display panel 905 to a more oblique angle relative to input surface 940; however, doing so results in a larger input surface 940, which changes the end shape of curved eyepiece 920 near input surface 940 and reduces image brightness.

In the illustrated embodiment, prism 915 is positioned using adjustable mount 917. Adjustable mount 917 allows prism 915 to slide laterally relative to input surface 940 of curved eyepiece 920. Adjusting prism 915 changes the length of the optical path experienced by display light 955, thereby providing tunable focus. Adjustable mount 917 may be implemented as a one-time focusing apparatus for initial factory calibration. For example, adjustable mount 917 may be a sled or track on which prism 915 is physically slid. Clear adhesive may be applied and cured with UV exposure when an in-focus position is achieved. Alternatively, adjustable mount 917 may allow end user focus adjustments via mechanical or electromechanical adjustments. For example, adjustable mount 917 may be implemented as a microelectromechanical system ("MEMS"), a piezoelectric actuator, or various purely mechanical actuators (e.g., threaded screw adjustment or otherwise).

As display light 955 is guided through curved lightguide 927 from input surface 940 to viewing region 960, the curvature of curved lightguide 927 imparts optical power with each reflection or refraction. Curved eyepiece 920 imparts refractive optical power at input surface 940 and upon emission of display light 955 out eye-ward facing surface 950. Curved eyepiece 920 imparts reflective optical power via four total internal reflection interactions and one reflection off of optical combiner 935. The optical power interactions collectively serve to magnify the display image and displace the virtual image so that the user can bring the image into focus in a near-eye configuration. One or each of world facing surface 945 and eye-ward facing surface 950 may variously conform each to a respective shape of a spherical surface, a freeform surface, a rotationally symmetric asphere surface, an anamorphic asphere surface, a toroid surface, a Zernike polynomial surface, a radial basis function surface, an x-y polynomial surface, a non-uniform rational b-spline surface, or otherwise.

Returning to FIG. 9A, optical combiner 935 may be implemented using a variety of different structures that redirect display light 955 along an eye-ward direction. For example, optical combiner 935 may be a partial reflector, a beam splitter (e.g., thin silver coating, multilayer dielectric thin film, etc.), a polarization sensitive beam splitter ("PBS"), a semi-polarizing beam splitter, or otherwise. In one embodiment, optical combiner 935 is more transmissive to visible light than it is reflective. For example, optical combiner 935 may be implemented as 15% reflective and 85% transmissive. Of course, other reflective/transmissive ratios may be implemented. Accordingly, viewing region 960 is partially transmissive to ambient light incident through world facing surface 945 such that viewing region 960 is see-through.

Figure 10A:
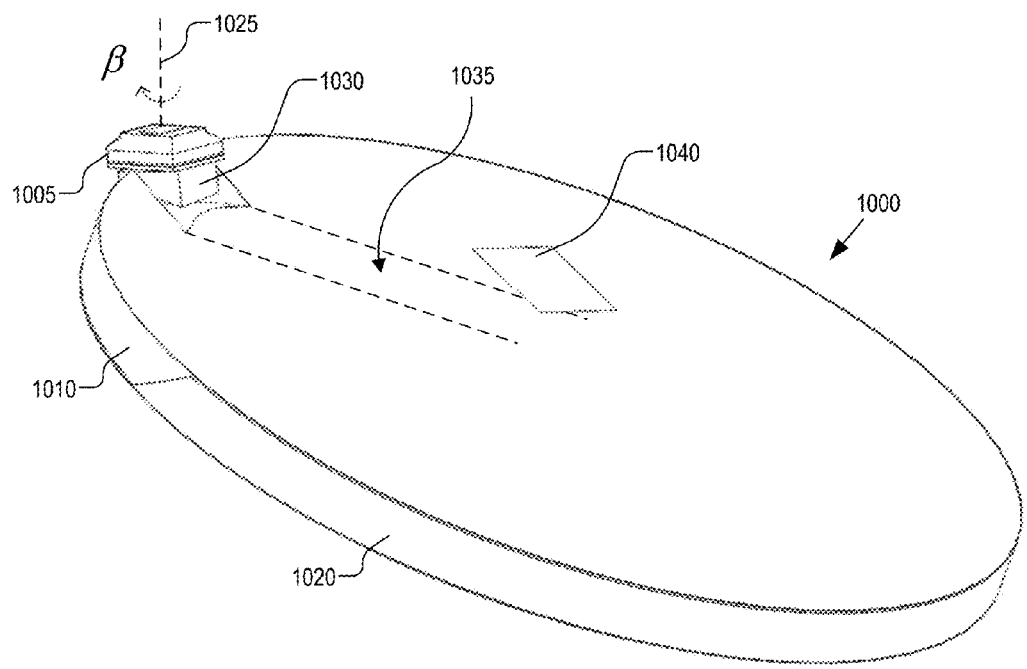
FIG. 10A is a perspective view illustration of a curved eyepiece fabricated according to an embodiment.
Figure 10B:
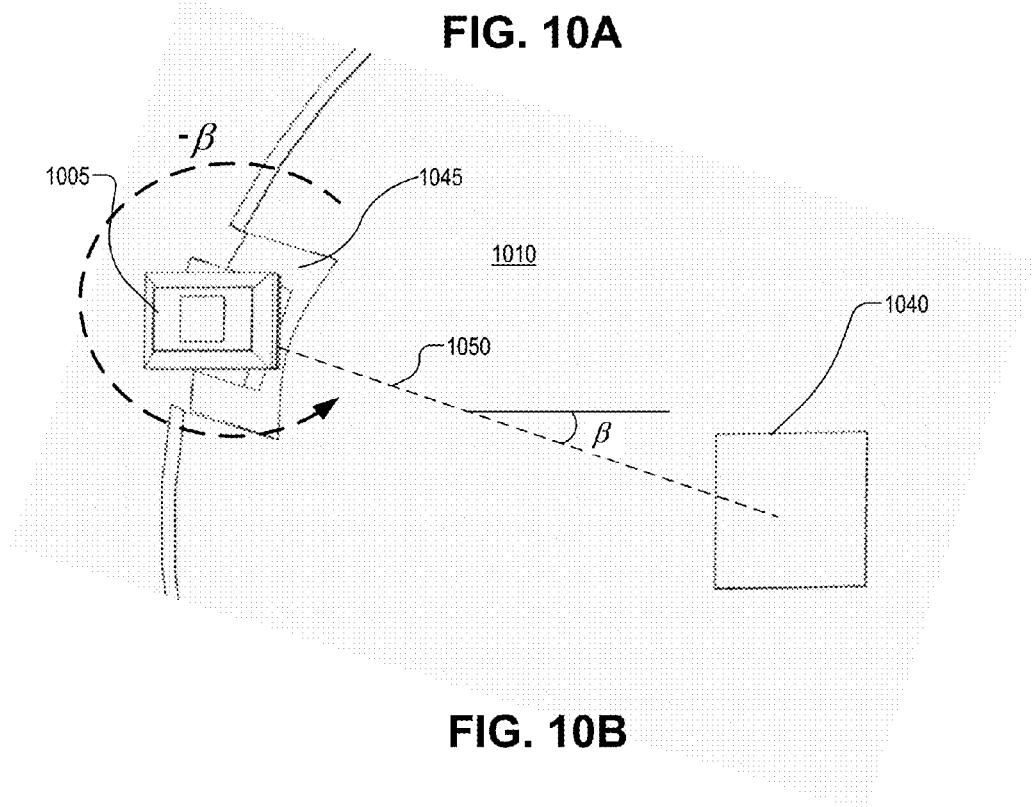
FIG. 10B is a close up illustration of a display panel and input surface of a curved eyepiece fabricated according to an embodiment.

FIG. 10A is a perspective view illustration of curved eyepiece 1000 and display panel 1005, in accordance with an embodiment of the disclosure. FIG. 10B is a close up illustration of the same showing how display panel 1005 is rotated by a complementary angle β to offset rotation effects on the display light from rotation of curved eyepiece 1000 by β, in accordance with an embodiment of the disclosure. As illustrated, in FIG. 10B the counter-rotation of display panel 1005 results in a level display image.

In one embodiment, a polarization rotator 1030 (e.g., polarization rotator 910 of FIG. 9A) is disposed in the optical path between display panel 1005 and input surface 1045. The polarization rotator 1030 operates to align the linear polarization of display light with the centerline 1050 of curved lightguide 1035. Centerline 1050 represents an axis of symmetry down the center of curved lightguide 1035. By aligning the linear polarization of the display light with this axis of symmetry, asymmetries in the polarization state caused by birefringence are reduced, thereby further improving the optical performance of the system. The polarization rotator 1030 can also be used to align a linear polarization of the display light for improved reflection efficiency off of an optical combiner (e.g., optical combiner 935). For example, the polarization rotator 1030 may be oriented such that the display light is incident upon the optical combiner substantially with only an s-polarization. S-polarization is linearly polarized light having an electric field that oscillates perpendicular to the plane of incidence with the optical combiner. S-polarization light is the polarization that substantially reflects off of a polarized beam splitter, as compared to the p-polarization which substantially passes through a polarized beam splitter. In one embodiment, the polarization rotator 1030 is a half-wave plate rotator that is rotated by an angle equal to one half β about axis 1025 relative to the plane of illustration in FIG. 9A. In one embodiment, the polarization rotator 1030 is a quarter-wave plate that converts linearly polarized light to circularly polarized light having substantially equal quantities of both linear polarizations with a 90 degree phase offset. Other rotations and polarization rotators may be selected to achieve the desired alignment to reduce the effects of birefringence on the display light as it propagates along curved lightguide 1035 and/or to improve reflection efficiency off the optical combiner. In embodiments where display panel 1005 does not output polarized light and the optical combiner is not polarization sensitive, the polarization rotator 1030 may be omitted. However, non-polarized display panels currently available tend to be too large or not sufficiently bright. Similarly, non-polarized optical combiners that are approximately only 15% reflective tend to be more difficult to fabricate.

FIG. 10A further illustrates how curved eyepiece 1000 is formed from two lens bodies 1010 and 1020 mated together. In one embodiment, lens body 1010 is mated to lens body 1020 using a clear adhesive having a refractive index that is less than the refractive index of lens bodies 1010 and 1020. The low index clear adhesive forms a total internal reflection boundary between the two lens bodies 1010 and 1020, which defines an interior boundary of curved lightguide 1035 within a thick portion of lens body 1010. Other coatings, such as an angle sensitive multi-layer dichroic coating may also be used. The viewing region 1040 of curved lightguide 1035 (e.g., viewing region 960) is defined by the optical combiner disposed at the junction between transition surfaces where lens bodies 1020 and 1010 are mated together. The optical combiner may be implemented as a partially reflective layer. In one embodiment, the partially reflective layer is a non-polarizing beam splitter coating. In one embodiment, the partially reflective layer is a polarizing beam splitter coating which is oriented to reflect polarized display light. Respective surfaces of lens bodies 1010, 1020—the surfaces internal to curved eyepiece 1000 may be molded to conform closely to one another, resulting in high quality optical performance with respect to light that propagates in curved lightguide 1035, light that reflects off of the optical combiner and/or light that propagates through the optical combiner.

Curved eyepiece 1000 is implemented as a thin, curved eyepiece having a thickness less than 8 mm, and in one embodiment is about 4.0 mm thick. In one embodiment, lens bodies 1010 and 1020 are formed of transparent optical grade plastic (e.g., polycarbonate, etc) having an index of refraction of 1.64. However, the higher the refractive index the thinner the curved eyepiece can be designed. A direct benefit of using higher index material is to reduce the angle at which TIR occurs. This effectively enables designs that reduce the angle of the output coupler, which can either increase the size of the eyebox for a given lightguide thickness or reduce the overall thickness of the lightguide for a given eyebox size. Using higher index material for the curved eyepiece can also provide greater flexibility in the refractive index of the optical grade adhesives used to bond the lens bodies 1010 and 1020 together. The curvatures of both an eye-ward facing surface of lens body 1010 and a world-facing surface of lens body 1020 may be implemented as spherical surfaces. Collectively, the curvature and slim nature of curved eyepiece 1000 provide a desirable industrial design. Curved eyepiece 1000 not only has desirable industrial design, but is also efficient since ideally the only lossy bounce for display light traveling from input surface 1045 to the optical combiner is the single redirection by the optical combiner itself. This permits the optical combiner and the viewing region to be substantially more transmissive than reflective thereby improving the see-through characteristic of curved eyepiece 1000 in the viewing region.

In the illustrated embodiment, the world-facing surface provides a complementary curvature to offset the optical power of the curvature of the eye-ward facing surface encountered by ambient light. Furthermore, in one embodiment, lens bodies 1010 and 1020 are fabricated of the same transparent materials or transparent materials having substantially the same index of refraction. Thus, curved eyepiece 1000 operates as a see-through display, which combines ambient light with the display light directed out a viewing region (e.g., viewing region 960) along an eye-ward direction into a user's eye. In this way, curved eyepiece 1000 is capable of displaying an augmented reality to the eye; however, the combined curvatures of the world facing surface and the eye-ward facing surface of curved eyepiece 1000 complement each other and collectively do not impart lensing power to ambient light as it passes through curved eyepiece 1000 in the viewing region. In other embodiments, the curvatures of the world facing surface and the eye-ward facing surface may be unbalanced to impart prescriptive lensing to the ambient light.

The processes described herein may be performed with one or more programmable processors executing one or more computer programs to perform actions by operating on input data and generating output. The processes may also be performed by special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer may be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

The processes explained herein are described in terms of computer software and hardware. The techniques described may constitute machine-executable instructions embodied within a tangible or non-transitory machine (e.g., computer) readable storage medium, that when executed by a machine will cause the machine to perform the operations described.

Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

What is claimed is:

1. A method comprising:
    forming a lens blank, including:
        molding a first blank body and a second blank body, including molding a step structure at a surface of the first blank body and a corresponding step structure at a surface of the second blank body and molding a facet of one of the first blank body and the second blank body;
        forming an optical combiner structure at one of the step structures of the first blank body and the second blank body; and
        bonding the surface of the first blank body to the surface of the second blank body, wherein respective molded surface portions of the step structure at the surface of the first blank body and the step structure at the surface of the second blank body are mated to one another within the lens blank;
    coupling the lens blank to one or more blocking structures; and
    forming an eyepiece from the lens blank, including:
        depositing a filler material over the facet prior to the machining the first blank body;
        removing at least a portion of the filler material during a machining of the first blank body;
        machining the first blank body to form a first surface of the eyepiece;
        machining the second blank body to form a second surface of the eyepiece that is opposite the first surface, wherein one of the first surface and the second surface is a concave surface and the other of the first surface and the second surface is a convex surface;
        polishing the first surface;
        polishing the second surface; and
        deblocking the eyepiece from the one or more blocking structures.

2. The method of claim 1, wherein a stepped interface of the lens blank is formed by the respective molded step structures of the first blank body and the second blank body.

3. The method of claim 1, wherein one of the first blank body and the second blank body is only indirectly coupled to any blocking structure during the machining the first blank body.

4. The method of claim 1, wherein a step portion of the first blank body includes a step structure at a first side of the first blank body which forms part of an exterior of the lens on part of the first side of the first blank body prior to the machining of the first blank body.

5. The method of claim 1, wherein, for at least 90% of a span the first blank body, a thickness of the first blank body is within 10% of an average thickness of the first blank body, wherein the span is along a first axis and the thickness is along second axis perpendicular to the first axis.

6. The method of claim 5, wherein, for at least 90% of the span the first blank body, the thickness of the first blank body is within 5% of the average thickness.

7. The method of claim 2, wherein the eyepiece includes a first lens body comprising a portion of the first blank body and a second lens body comprising a portion of the second blank body, wherein a first overlap portion of the first blank body extends over a portion of the stepped interface, wherein an average thickness of the first overlap portion is equal to or less than 1 millimeter.

8. The method of claim 7, wherein the average thickness of the first overlap portion is equal to or less than 300 microns.

9. The method of claim 7, wherein a second overlap portion of the second blank body extends over a portion of the stepped interface, wherein an average thickness of the second overlap portion is equal to or less than 1 millimeter.

10. The method of claim 1, further comprising:
    accessing sensor information identifying respective locations of reference points of the assembly; and
    accessing predetermined reference information identifying a configuration of the reference points relative to a stepped interface, wherein the machining the first blank body or the polishing the first surface is based on the sensor information and the predetermined reference information.

11. The method of claim 1, further comprising:
    attaching a display panel directly or indirectly to the eyepiece, wherein the display panel is configured to emit display light towards an input surface of the eyepiece.

* * * * *